2,864,812

WATER SOLUBLE DYE SALTS

Werner Bossard, Riehen, near Basel, and Jacques Voltz and Francois Favre, Basel, Switzerland, assignors to J. R. Geigy A.-G., Basel, Switzerland, a Swiss firm No Drawing. Application December 12, 1955
Serial No. 552,292

Claims priority, application Switzerland
December 15, 1954

6 Claims. (Cl. 260—146)

The invention is concerned with the production of water soluble dye salts which contain an azo dyestuff as cation.

It has been found that stable, water soluble dye salts are obtained which contain the azo dyestuff as cation if an azo dyestuff which contains no acid dissociating, salt forming groups and has the atom structure I

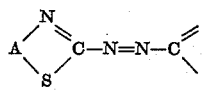
(I)

wherein A represents an alkene radical which is bound by two neighbouring carbon atoms joined by a double linkage to the S atom and the N atom and which can be further substituted as desired, and wherein the unsaturated C atom linked to the azo group forms part of any azo component desired, is reacted at a raised temperature with suitable alkylating agents.

In the azo dyestuffs used according to the present invention, A represents, for example, an ethene radical, a propene radical, a $\Delta_1$- or $\Delta_2$-butene radical, a $\Delta_3$-hexene radical or a phenyl-, cycloalkyl-, halogen-, alkoxy-, nitro-, or acyl-aminoalkene radical. In other words, thiazole rings are bound to the azo group which contain no fused aromatic-isocyclic rings but otherwise the 4- and 5-positions of the thiazole ring can be further substituted as desired within the bounds of the definition.

The unsaturated C atom bound to the azo group can form part of an aliphatic, cycloaliphatic, isocyclic-aromatic or heterocyclic-aromatic group, for example part of an acycloacetyl group, of a dihydroresorcinol ring, of a phenyl or naphthalene ring, of a pyrrole or a pyrazole ring which, with other radicals, for example with amido, hydroxyl, amino, acylamino, alkyl, aralykl, aryl groups or with fused rings, can form the azo component. The unsaturated C atom can also, for example form part of an acetoacetyl phenyl amide, of a hydroxyphenyl or a hydroxynaphthyl radical, of an aminophenyl or naphthyl radical, of an acylaminophenyl or an acylaminonaphthyl radical, of a 3-indolyl radical, a 5-hydroxy or 5-amino pyrazole radical. Thus the term "azo component" should not be limited to the actual azo coupling components but should embrace further classes of compounds such as result for example on the acylation of p-aminoazo dyestuffs. Also this term should not have a limiting effect so as to mean that only dyestuffs obtained by azo coupling should be used. Rather, the dyestuffs used according to the present invention can be produced by any method desired, for example by alkaline condensation of p-nitrosophenols or of p-nitrosoaminophenyl compounds by methods known per se with 2-aminothiazole compounds or, technically more advantageously, by coupling diazotised 2-aminoazoles with coupling components substituted as desired within the bounds of the definition, the resulting azo dyestuffs being further modified before or during use, for example being acetylated or alkylated.

Chiefly isocyclic-aromatic amino and hydroxyl compounds are used as coupling components, preferably those coupling in the p-position to these groups. The isocyclic-aromatic ring can also possibly contain fused hetero rings such as, for example, in the 4-aminobenztriazole, 4-aminobenzimidazole or 4-aminoindazole compounds. In the preferred p-aminoarylazo dyestuffs, the amino group can be primary, secondary or tertiary. The substituents of the amino group can be aliphatic, araliphatic, alicyclic, aromatic or heterocyclic. They can be further substituted such as in the oxalkyl, fluoralkyl, cyanalkyl, alkoxy and phenoxyalkyl, alkylphenyl, alkoxyphenyl, halogenphenyl and alkylbenzyl, halogenbenzyl and alkoxybenzyl compounds. Aliphatic substituents of the amino group can form, either among themselves or also with an ether atom or with the aromatic radical having the amino group, hydrogenated hetero rings such as in the piperidino, morpholino, 1.2.3.4-tetrahydroquinoline, lilolidine, julolidine, perimidine compounds. The p-aminophenyl radical preferred in the azo dyestuffs according to the present invention can be further substituted within the bounds of the definition, for example by halogen, alkyl, alkoxy, nitro, acylamino, alkylsulphonyl groups. Monoazo dyestuffs are to be preferred to polyazo dyestuffs.

Suitable alkylating agents for the production of the dye salts according to the present invention are the esters of strong mineral acids and organic sulphonic acids of preferably lower alcohols. Chiefly alkyl chlorides, alkyl bromides, aralkyl halides, dialkyl sulphates and alkyl-p-methylbenzene sulphates are used. The monoazo dyestuffs usable according to the present invention are reacted with the suitable alkylating agents preferably in inert organic solution whereupon the dye salts sometimes precipitate. Examples of inert organic solvents are benzene hydrocarbons, halogenobenzenes and nitrobenzenes. The reaction can also be performed in cycloaliphatic hydrocarbons or in excess alkylating agents. The reaction is exothermic, but in the presence of diluents, it is necessary to warm the components. However, in some favourable cases the salt formation occurs also in aqueous or alcoholic solution or suspension, the dye salts being dissolved whereupon they can be isolated by salting out. If the reaction is performed in the presence of inert organic solvents, these, due to the great stability of the dye salts according to the present invention, can be removed for example by steam distillation, whereupon the dye salts are salted out. The dye salts according to the present invention can also be obtained however, by extraction with water and salting out or by distilling off the organic solvent. It is advantageous to use an excess of alkylating agent, if desired primary and secondary amino groups being subsequently alkylated, but it seems clear that the formation of the cyclammonium salt takes place first. The dye salts obtained according to the present invention can also possibly be further altered, for example they can be acylated.

The dye salts according to the present invention correspond to the general Formula II:

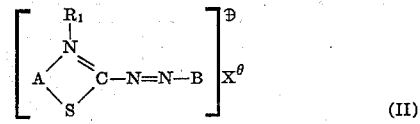
(II)

In this formula:

$R_1$ represents an alkyl group, possibly further substituted, for example by a methyl, ethyl, propyl, butyl, oxethyl, benzyl group, A represents an alkene radical which may also be further substituted, B represents the radical of an azo component in the broadest sense of the word including the azo coupling components which are further modified, possibly after the coupling, and X⁰ represents the anion equivalent to the coloured cation.

As has already been stressed, the coloured cation advantageously contains no acid dissociating groups. The anion is generally derived from a strong inorganic or organic acid, for example from the halogen hydracids, sulphuric acid and the aromatic sulphonic acids, i. e. from acids the pK value of which is at most 4. The anions most generally used are chlorine ion, bromine ion, metho- and etho-sulphate ion, sulphate ion, bisulphate ion and p-toluene sulphonate ion. As however, the strongly basic cations also form stable salts with weaker acids, also radicals of other organic acids are used; for example salts of formic acid, acetic acid, oxalic acid, lactic acid and also the dye bases themselves. Therefore, also the hydroxyl group is included in the meaning of the anion equivalent to the cation. Often it is of advantage to produce and use double salts with inorganic salts, in particular the zinc chloride double salts.

Because of their character, the dye salts according to the present invention can be considered as basic dyestuffs. Particularly in the form of salts of strong inorganic and organic acids they dissolve well in water. Less easily soluble compounds can be dissolved in water by the addition of acids. The dyestuffs according to the present invention dye cotton mordanted with tartar emetic and tannin, silk, leather and polymeric synthetic fibres which consist of polyacrylonitrile or are produced chiefly from acrylonitrile, generally in very pure shades. The dyeings attained with the dyestuffs according to the present invention are often distinguished by their fastness to light.

The following examples serve to illustrate the invention. Where not otherwise stated, parts are given as parts by weight and the temperatures are in degrees centigrade. The relationship of parts by weight to parts by volume is as that of kilogrammes to litres.

*Example 1*

10 parts of 2-amino thiazole are dissolved in 20 parts of concentrated sulphuric acid and diazotised at —5° with 34 parts of nitrosyl sulphuric acid, which correspond to 6.9 parts of sodium nitrite. A solution of 14.3 parts of 1-aminonaphthalene in 200 parts of concentrated acetic acid is poured at 0° into the diazo solution which has been diluted with 600 parts of ice. The mineral acid is buffered by the dropwise addition of a concentrated aqueous solution of sodium acetate up to the bisulphate state, the monoazo dyestuff is then drawn off under suction, washed with water and sodium carbonate solution well and dried at 80° in the vacuum.

1.9 parts of dimethyl sulphate in 10 parts of chlorobenzene are added dropwise at boiling temperature within one hour to a solution of 2.5 parts of the dry, blue-violet dyestuff in 100 parts of chlorobenzene. The red-violet solution turns blue and the dye salt precipitates as a dark powder. After cooling the reaction mass, the dyestuff is filtered off and dissolved in 250 parts of hot water in order to further purify it. It is precipitated with sodium chloride from the solution which has been clarified with a little animal charcoal, drawn off under suction and dried. It is a dark blue, bronzy powder which dissolves in concentrated sulphuric acid with a yellow and in water with a blue colour. It dyes polyacrylonitrile fibres, mordanted cotton and silk from an acetic acid bath in vivid blue-violet shades which have good fastness properties. Products with similar properties are obtained by coupling the diazotised 2-amino thiazole with 14.3 parts of 2-aminonaphthalene, 17.3 parts of 1-amino-2-methoxynaphthalene, 21.9 parts of 1-(N-phenyl)-aminonaphthalene, 17.1 parts of 1-(N.N-dimethylamino)-naphthalene, 20.0 parts of 1.2.3.4-tetrahydro-3-hydroxy-7.8-benzquinoline or 18.3 parts of 1.2.3.4-tetrahydro-5.6-benzquinoline instead of 14.3 parts of 1-amino-naphthalene and then methylating the monoazo dyestuff.

*Example 2*

11.4 parts of 2-amino-4-methyl thiazole are diazotised as described in Example 1 with nitrosyl sulphuric acid corresponding to 6.9 parts of sodium nitrite and the diazo compound is coupled in the presence of 200 parts of concentrated acetic acid with 18.3 parts of diphenyl-N-methylamine. 3.1 parts of the dry azo dyestuff are ethylated in 100 parts of chloroform with 3 parts of diethyl sulphate for some hours at the temperature at which the solvent boils under reflux. After cooling the reaction mass, the precipitated reaction product is filtered off and dissolved in 200 parts of hot water. The blue solution is filtered and the dyestuff is precipitated with 1.5 parts of zinc chloride and sodium chloride, drawn off under suction and dried. It is obtained as a dark powder which dissolves in water with a dark blue and in concentrated sulphuric acid with a yellowish-green colour.

The dyestuff dyes polyacrylonitrile fibres, mordanted cotton, silk and leather from an acetic acid bath in blue violet shades which have good fastness properties. Water soluble dyestuffs with similar properties are obtained by using equivalent amounts of 2-amino-4-methoxy thiazole (13.0 parts), 2-amino-4-acetyl thiazole (14.2 parts), 2-amino-4-n-butyl thiazole (15.6 parts), 2-amino-4-phenyl thiazole (17.6 parts) 2-amino-4.5-dimethyl thiazole (12.8 parts), 2-amino-4-methyl-5-ethyl thiazole (14.2 parts), 2-amino-4-ethyl-5-methyl thiazole (14.2 parts), 2-amino-4-methyl-5-(β-oxethyl)-thiazole (15.8 parts) or 2-amino-4.5-diphenyl thiazole (25.2 parts), 2-amino-4-carbethoxy-5-methyl thiazole (18.6 parts) or 2-amino-4-bromo-5-phenyl thiazole (25.4 parts) as diazo components, using the same coupling component or an equivalent amount of triphenylamine and ethylating the monoazo dyestuff.

*Example 3*

10 parts of 2-amino thiazole are diazotised as described in example 1 and coupled in an acetic acid medium with 9.4 parts of phenol.

The orange monoazo dyestuff obtained is converted as in Example 1, with dimethyl sulphate using toluene as solvent, into the water soluble dyestuff. The dye salt is isolated and purified in a manner analogous to that described in Example 1 and finally it is obtained as a red powder which dissolves in water with a red and in concentrated sulphuric acid with a yellow colour. The dyestuff dyes polyacrylonitrile fibres, silk, mordanted cotton and leather from an acetic acid bath in orange shades which have good properties. The same water soluble product is obtained by treating the azo dyestuff with dimethyl sulphate in aqueous/alkaline solution. Instead of dimethyl sulphate, also ethyl iodide, p-toluene sulphonic acid methyl ester, p-toluene sulphonic acid ethyl ester, p-toluene sulphonic acid-n-butyl ester as well as benzyl bromide can be used as alkylating agent.

*Example 4*

12.8 parts of 2-amino-4.5-dimethyl thiazole are diazotised as described in Example 1 and then coupled with 10.8 parts of 1-hydroxy-4-methylbenzene dissolved in 20 parts of acetic acid. The dried dyestuff is methylated under pressure at 130° for some hours with methyl iodide in benzene and the reaction mixture is worked up as described in Example 1. The dyestuff dyes polyacrylonitrile fibres, mordanted cotton, silk or leather from an acetic acid bath in brown red shades. A product with similar properties is obtained by using 16.4 parts of 1-hydroxy-4-amylbenzene as coupling component.

Example 5

A diazo solution is prepared from 10 parts of 2-amino thiazole in 20 parts of concentrated sulphuric acid with nitrosyl sulphuric acid, corresponding to a content of 6.9 parts of sodium nitrite. 12.1 parts of N.N-dimethyl-aminobenzene in 50 parts of 60% acetic acid and the equivalent amount of mineral acid are added dropwise to the diazo solution at −15 −5°. The coupling mass is stirred for 2 hours, 300 parts of water are added in portions and the mineral acid reaction is buffered by the dropwise addition of an aqueous solution of sodium acetate. The red-violet dyestuff which precipitates is drawn off under suction, washed and dried.

1.9 parts of dimethyl sulphate in 10 parts of chlorobenzene are added at boiling temperature within 1 hour to a solution of 2.3 parts of this dyestuff in 100 parts of chlorobenzene. The red solution turns blue and the dyestuff precipitates. After cooling the reaction mass, the dyestuff is filtered off and, to further purify, dissolved in 250 parts of hot water. It is precipitated from the solution which has been clarified with a little animal charcoal with sodium chloride, filtered off and dried. The dyestuff is in the form of a dark powder which dissolves in concentrated sulphuric acid with a yellow and in water with a blue colour. It dyes polyacrylonitrile fibres from an acetic acid bath in vivid blue-violet shades. The dyeings have excellent fastness to light. Similar dyeings with good fastness properties are obtained on mordanted cotton, silk or leather.

Other solvents such as chloroform, benzene, toluene, xylene, dekaline, tetraline, o-dichlorobenzene can be used instead of chlorobenzene. Products with similar properties are obtained if in the above example the compounds listed in the following table are used as coupling components and the amounts given are used for the alkylation and otherwise the same procedure is followed:

Example 6

10 parts of 2-amino thiazole are diazotised as described in Example 5 and coupled with 15.3 parts of 2.5-dimethoxy-1-amino-benzene using acetic acid as solvent. As described in that example, the monoazo dyestuff is isolated and dried. 2.64 parts of the dry dyestuff are dissolved in 100 parts of chlorobenzene and reacted, as described in Example 5, with 1.9 parts of dimethyl sulphate, isolated and precipitated with zinc chloride from aqueous solution and then dried. The dyestuff is a blue powder which dissolves in water with a violet colour and it dyes polyacrylonitrile fibres in the presence of 1% acetic acid in violet shades. Instead of 2.5-dimethoxy-1-aminobenzene, the coupling components listed in the following table can be used and, on keeping to the alkylating conditions given above, dye salts with similar properties are obtained.

| Coupling component | Parts of dyestuff | Parts of solvent | Alkylating agent | Colour of solution | | Dyeing on polyacrylo-nitrile fibres |
|---|---|---|---|---|---|---|
| | | | | in H₂O | in H₂SO₄ conc. | |
| amino-2.5-dimethylbenzene | 2.32 | 150 | 1.9 Pts. dimethyl sulphate | violet | yellow | violet. |
| amino-2-methoxy-5-methylbenzene | 2.48 | 130 | do | do | do | Do. |
| amino-3-methylbenzene | 2.18 | 120 | 2.8 Pts. p-toluene sulphonic acid methyl ester | do | do | Do. |
| amino-2-methoxy-5-acetaminobenzene | 2.91 | 110 | do | do | do | Do. |
| amino-3-chlorobenzene | 2.385 | 110 | do | red-blue | do | red-blue. |
| N-ethylaminobenzene | 2.32 | 160 | 2.6 Pts. benzyl bromide | violet | do | violet. |
| N-benzylaminobenzene | 2.94 | 120 | do | do | do | Do. |
| N-phenylaminobenzene | 2.80 | 110 | do | do | do | Do. |
| N-ethylamino-3-methylbenzene | 2.46 | 150 | 2.3 Pts. diethyl sulphate | do | do | Do. |
| N-ethylamino-3-chlorobenzene | 2.665 | 140 | do | do | do | Do. |

Example 7

The dyestuff from 2-amino thiazole and N.N-dimethylamino-2.5-dimethylbenzene is produced in the manner analogous to that described in Example 1.

A solution of 2.6 parts of this dyestuff in 200 parts of abs. alcohol is heated under pressure for 2 hours at 120° with 4.35 parts of ethyl bromide. The reaction mixture is considerably evaporated in the vacuum. It is worked up as described in Example 1. The dyestuff dissolves in concentrated sulphuric acid with a yellow and in water with a blue colour. It dyes polyacrylonitrile fibres and silk from an acetic acid bath in blue shades.

Dyestuffs with similar properties are obtained by alkylating with methyl iodide, methyl bromide, methyl chloride or also butyl iodide while keeping to the above conditions.

| Coupling component | Parts of dyestuff | Parts of solvent | Alkylating agent | Colour of solution | | Dyeing on polyacrylo-nitrile fibres |
|---|---|---|---|---|---|---|
| | | | | in H₂O | in H₂SO₄ conc. | |
| N.N-di-(β-oxethyl)aminobenzene | 2.92 | 150 | 1.9 Pts. dimethyl sulphate | reddish blue | yellow | reddish blue. |
| N-methyl-N-β-oxethylaminobenzene | 2.62 | 130 | do | do | do | Do. |
| N-methyl-N-β-cyanethyl aminobenzene | 2.61 | 130 | do | do | do | Do. |
| N-ethyl-N-benzylaminobenzene | 3.22 | 170 | do | do | do | Do. |
| N.N-dibenzylaminobenzene | 3.84 | 200 | 2.8 Pts. p-toluene sulphonic acid methyl ester | blue | do | Do. |
| N-methyl diphenylamine | 2.94 | 150 | 2.3 Pts. diethyl sulphate | do | do | Do. |
| N-phenyl morpholine | 2.74 | 140 | do | reddish blue | do | Do. |
| N.N-dimethylamino-3-nitrobenzene | 2.77 | 140 | 2.8 Pts. p-toluene sulphonic acid methyl ester | do | do | Do. |
| N.N-diethylaminobenzene | 2.60 | 130 | do | do | do | Do. |
| N.N-dimethylamino-3-methylbenzene | 2.46 | 120 | 1.9 Pts. dimethyl sulphate | red-blue | do | red-blue. |
| N.N-dimethylamino-2.5-dimethylbenzene | 2.60 | 130 | do | do | do | Do. |
| N.N-dimethylamino-2-methoxy-5-methylbenzene | 2.76 | 140 | 2.8 Pts. p-toluene sulphonic acid methyl ester | do | do | Do. |
| N.N-dimethylamino-2.5-dimethoxybenzene | 2.92 | 150 | do | do | do | Do. |
| N.N-diethylamino-3-chlorobenzene | 2.95 | 150 | 2.6 Pts. benzyl bromide | do | do | Do. |
| N.N-dimethylamino-3-methoxybenzene | 2.62 | 130 | 1.9 Pts. dimethyl sulphate | reddish blue | do | reddish blue. |
| N.N-dimethylamino-3-carbethoxybenzene | 3.04 | 150 | 3.8 Pts. dimethyl sulphate | yellow brown | do | yellow brown. |
| 1-phenyl-3-methyl-5-aminopyrazole | 2.84 | 120 | 1.9 Pts. dimethyl sulphate | | | |
| pyrrole | 1.80 | 100 | do | blue | do | blue. |
| indole | 2.80 | 100 | 2.3 Pts. diethyl sulphate | do | do | ruby. |

What we claim is:
1. A dyestuff of the general formula:

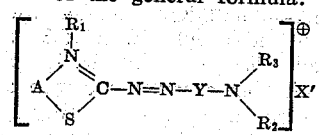

wherein the cation is free from acid salt forming groups and $R_1$ is a member selected from the group consisting of lower alkyl and benzyl, A means an alkene radical, the two adjacent double bound C atoms of which are connected to the N and S atoms of the hetero nucleus, Y means a para-phenylene radical, $R_2$ and $R_3$ each mean a member selected from the group consisting of hydrogen, lower alkyl, benzyl, cycloalkyl and phenyl, and taken together with —N< form a saturated heterocyclic ring system, and X' means an anion.

2. A dyestuff of the formula:

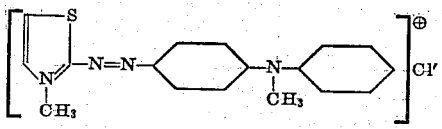

3. A dyestuff of the formula:

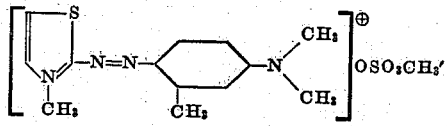

4. A dyestuff of the formula:

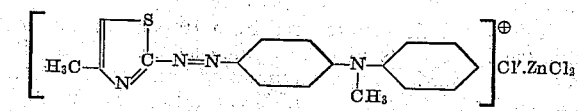

5. A dyestuff of the formula:

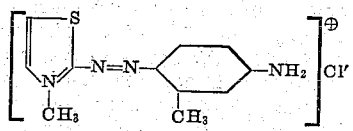

6. A dyestuff of the formula:

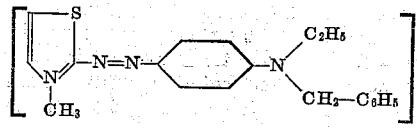

References Cited in the file of this patent

UNITED STATES PATENTS

| | | |
|---|---|---|
| 2,135,293 | Renshaw et al. | Nov. 1, 1938 |
| 2,441,612 | Argyle et al. | May 18, 1948 |
| 2,659,719 | Dickey et al. | Nov. 17, 1953 |
| 2,746,953 | Dickey et al. | May 22, 1956 |

FOREIGN PATENTS

| | | |
|---|---|---|
| 136,921 | Switzerland | Feb. 17, 1930 |